(12) United States Patent
Crottereau et al.

(10) Patent No.: US 9,261,409 B2
(45) Date of Patent: Feb. 16, 2016

(54) TEMPERATURE CONTROL DEVICE

(75) Inventors: Olivier Crottereau, Gan (FR); José Fernandez, Artiguelouve (FR)

(73) Assignee: Wintech, Uzos (FR)

(*) Notice: Subject to any disclaimer, the term of this patent is extended or adjusted under 35 U.S.C. 154(b) by 68 days.

(21) Appl. No.: 13/515,474

(22) PCT Filed: Nov. 29, 2010

(86) PCT No.: PCT/FR2010/000794
§ 371 (c)(1),
(2), (4) Date: Aug. 23, 2012

(87) PCT Pub. No.: WO2011/073541
PCT Pub. Date: Jun. 23, 2011

(65) Prior Publication Data
US 2012/0307862 A1   Dec. 6, 2012

(30) Foreign Application Priority Data
Dec. 18, 2009  (FR) ..................... 09 06184

(51) Int. Cl.
| | | |
|---|---|---|
| *G01J 5/00* | (2006.01) | |
| *G01J 5/08* | (2006.01) | |
| *G01J 5/04* | (2006.01) | |
| *G02B 23/16* | (2006.01) | |
| *G02B 23/12* | (2006.01) | |

(52) U.S. Cl.
CPC .. *G01J 5/08* (2013.01); *G01J 5/041* (2013.01); *G01J 5/0806* (2013.01); *G01J 5/0859* (2013.01); *G01J 5/0875* (2013.01); *G01J 5/0893* (2013.01); *G02B 23/16* (2013.01); *G02B 23/12* (2013.01); *Y10T 29/49826* (2015.01)

(58) Field of Classification Search
CPC ........... G01J 5/08; G01J 5/041; G01J 5/0859; G01J 5/0875; G01J 5/0893; G01J 5/0806; G02B 23/16; G02B 23/12
See application file for complete search history.

(56) References Cited

U.S. PATENT DOCUMENTS 5,463,222 A * 10/1995 Lesko et al. ............... 250/330
6,060,990 A *  5/2000 Flegel ......................... 340/584

(Continued)

FOREIGN PATENT DOCUMENTS

| JP | 03-028789 | A |   | 2/1991 |
| JP | 03028789  | A | * | 5/1991 |

OTHER PUBLICATIONS

Japanese Office Action dated Oct. 21, 2014 issued in Japanese (translation only) Patent Application No. 2012-543860 (translation only).

*Primary Examiner* — Lisa Caputo
*Assistant Examiner* — Janice M Soto
(74) *Attorney, Agent, or Firm* — Arent Fox LLP

(57) ABSTRACT

The invention relates to a temperature control device (1) intended to be attached inside an opening (2) of a wall (8) defining an area to be controlled, said device including: a frame (4) intended to be fitted into said opening (2), provided with a means for attachment onto said opening, and with a sealing means for ensuring that the wall (8) is sealed at the opening (2); a heat sensor (5) that is housed inside the frame (4) and is arranged so as to receive infrared waves and convert said waves into electrical signals; and an optical system (6) that is rigidly connected to the frame (4) and is intended for focusing the infrared waves, coming from the area to be controlled, toward said heat sensor (5). The invention also relates to a chamber, having an opening and at least one such temperature control device mounted into said chamber. The invention moreover relates to a method for mounting such a temperature control device into an opening of a wall defining an area to be controlled.

18 Claims, 4 Drawing Sheets

(56) References Cited

U.S. PATENT DOCUMENTS

| | | | |
|---|---|---|---|
| 6,144,031 A * | 11/2000 | Herring et al. | 250/352 |
| 7,785,003 B2 * | 8/2010 | Blichmann | 374/208 |
| 2003/0169518 A1 * | 9/2003 | Irani | 359/820 |
| 2004/0109490 A1 * | 6/2004 | Asakura et al. | 374/133 |
| 2006/0209397 A1 * | 9/2006 | Holliday et al. | 359/350 |
| 2006/0289768 A1 * | 12/2006 | Vallese et al. | 250/353 |

* cited by examiner

TEMPERATURE CONTROL DEVICE

CROSS-REFERENCED TO RELATED APPLICATION

This application is a National Stage entry of International Application PCT/FR2010/000794, filed Nov. 29, 2010, which claims priority to French Patent Application No. 0906184, filed Dec. 18, 2009, the disclosure of the prior applications are hereby incorporated in their entirety by reference.

FIELD OF THE INVENTION

The invention relates to a temperature control device for monitoring the temperature of objects situated in an area defined by a wall.

The invention particularly relates to the temperature monitoring of objects situated inside a closed enclosure.

STATE OF THE RELATED ART

For some applications, it is necessary to monitor the temperature of objects through a wall. This is particular the case of electrical equipment placed inside a cabinet and wherein the temperature is to be monitored regularly so as to detect any problems.

Electrical equipment, particularly high and medium-voltage equipment, may be subject to electric arcs of varying intensity giving rise to fires or even explosions. Moreover, it is established that approximately 40% of fires are caused in electrical installations. In this way, for obvious safety reasons, it is essential to monitor the temperature of this type of equipment regularly and reliably.

For effective prevention of these hazards, it is known to periodically inspect the critical areas of electrical equipment by means of infrared thermography. To enable these periodical inspections, it is particularly known to provide the outer walls of the electrical equipment with one or a plurality of suitable positioned windows or viewing ports.

These windows allow infrared radiation to pass through and thus enable the viewing of the electrical equipment to be monitored via said windows, by an infrared camera. FIG. 1 illustrates this prior art wherein the cabinet for housing the electrical equipment is provided with such a window and an infrared camera is arranged opposite said viewing window so as to obtain an infrared image of inside the cabinet. Such windows are particularly described in the document FR 2 743 153. The use of such a port is particularly advantageous. Indeed, the use of a viewing port makes it possible to do away with the disassembly operation of the partitions of the cabinet for housing the electrical equipment. Moreover, monitoring can be carried out under normal electrical conditions, without switching off the electrical equipment to be monitored, so as to obtain reliable monitoring in complete safety.

However, this monitoring method requires a qualified operator and operations for arranging and setting the infrared camera such that the infrared image of the electrical equipment is not obtained immediately. Moreover, this method is not suitable for the continuous monitoring of the temperatures of the electrical equipment housed in the cabinet.

AIM OF THE INVENTION

The aim of the invention is that of remedying these problems by providing a device for monitoring the temperature of an area defined by a wall, suitable for obtaining temperature monitoring rapidly by means of infrared thermography.

For this purpose, according to a first aspect, the invention relates to a temperature monitoring device intended to be attached inside an opening of a wall defining an area to be monitored comprising:
- a single frame intended to be fitted into said opening, provided with means for attachment onto said opening and with sealing means for attaching the frame on the wall and ensuring that the wall is sealed at the opening;
- a heat sensor that is housed in said single frame and is arranged so as to receive infrared waves and convert said waves into electrical signals.

Advantageously, the device comprises an optical system housed in said frame and rigidly connected therewith for focussing the infrared waves, coming from the area to be monitored, towards said heat sensor.

In this way, the temperature monitoring device can be permanently attached to the wall such that infrared thermographic monitoring can be carried out practically immediately without requiring specific setting operations for each monitoring operation. In particular, the installation and setting of a camera is rendered unnecessary since the heat sensor is integrated in the frame which is in turn attached in the wall. The device makes it possible to obtain a thermal image directly without using a separate camera.

Moreover, since the device is attached permanently onto the wall, it is suitable for continuous monitoring the temperature of the objects inside the enclosure.

Finally, this temperature monitoring device does not affect the tightness of the wall such that the penetration of dust, water or other foreign bodies inside the area to be monitored is not allowed at the wall.

Advantageously, the optical system forms a front wall of the device, intended to be positioned between the wall and the area to be monitored. In this way, the proximity of the optical system with respect to the monitored area makes it possible to monitor a much larger area.

In one embodiment, the device comprises a support disk, attached in a tight manner to the frame, and having a central orifice for positioning the optical system. This support disk forms, with the optical system, a front wall of the device. Advantageously, the optical system protrudes to the front with respect to the support disk so as to obtain a wide monitoring field.

In one advantageous embodiment, the optical system is a wide-angle lens.

Advantageously, the device further comprises a card for processing the signals from the heat sensor, housed in the frame. Moreover, the device comprises means for displaying an infrared image, housed in the frame and extending to the rear face of the device. In this way, all the elements for monitoring form a single assembly suitable for being attached during the same wall mounting operation.

In one embodiment, the device comprises an integrated alarm system, connected to said processing card and suitable for generating an alarm signal for notifying overheating in the area to be monitored.

In one embodiment, the device comprises a removable protective cover of the display means arranged to cover the rear face of the device.

In one embodiment, the device comprises a connector intended to receive an electrical power supply connector. In this way, the device does not require an internal power supply and can easily be connected to an external power supply. Power supply by a battery-powered system can also be envisaged.

In one embodiment, the device comprises a USE port for exchanging data with a computer or external devices.

In one embodiment, the device comprises a frame comprising a main body and a cylindrical threaded ring intended to be inserted into said opening; and a nut intended to be mounted on the threaded ring, so as to sandwich the wall between the main body and the frame and the nut. These attachment means enable quick and reliable mounting of the device.

Advantageously, the device comprises an O-ring, mounted on the threaded ring between the wall and the main body of the frame so as to ensure the tightness of the wall at the opening.

The device further comprises a self-adhesive flat seal mounted on said wall and inserted between the wall and the nut.

According to a second aspect, the invention relates to an enclosure comprising a wall having an opening and at least one temperature monitoring device according to the first aspect of the invention, fixedly mounted in said opening.

Finally, according to a third aspect, the invention relates to a method for mounting a temperature monitoring device according to a first aspect of the invention, inside an opening of a wall defining an area to be monitored, said method comprising a step consisting of fitting the frame inside said opening and a step for attaching the device on the wall.

Advantageously, the temperature monitoring, device is arranged such that the optical system protrudes towards the area to be monitored.

BRIEF DESCRIPTION OF THE FIGURES

Further aims and advantages of the invention will emerge in the course of the following description, with reference to the appended figures, wherein.

EXAMPLE OF EMBODIMENT

The temperature monitoring device 1 according to the invention is intended to be attached inside an opening 2 formed on a wall 8 defining an area to be monitored. The wall is for example that of an enclosure 3 wherein objects to be monitored are housed. For example, the enclosure to be monitored is an electrical cabinet comprising circuit breakers, fuses, transformers, electric motors and/or capacitive benches. However, the invention is not limited to temperature monitoring of electrical equipment and the invention is also applicable for monitoring an industrial process (food processing for example) or for monitoring people (medical or prison sector), for example.

Figure 1:
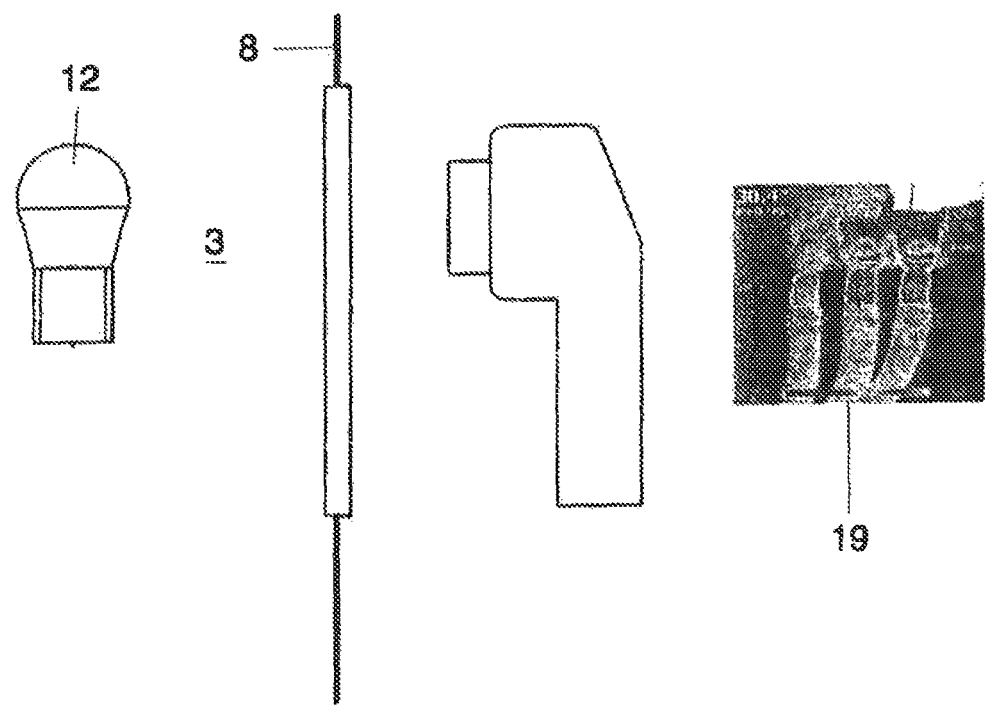
FIG. 1 is a schematic view of a temperature monitoring assembly according to the prior art comprising a viewing port and an infrared camera arranged opposite said port so as to obtain an infrared image inside the enclosure to be monitored.
Figure 2:
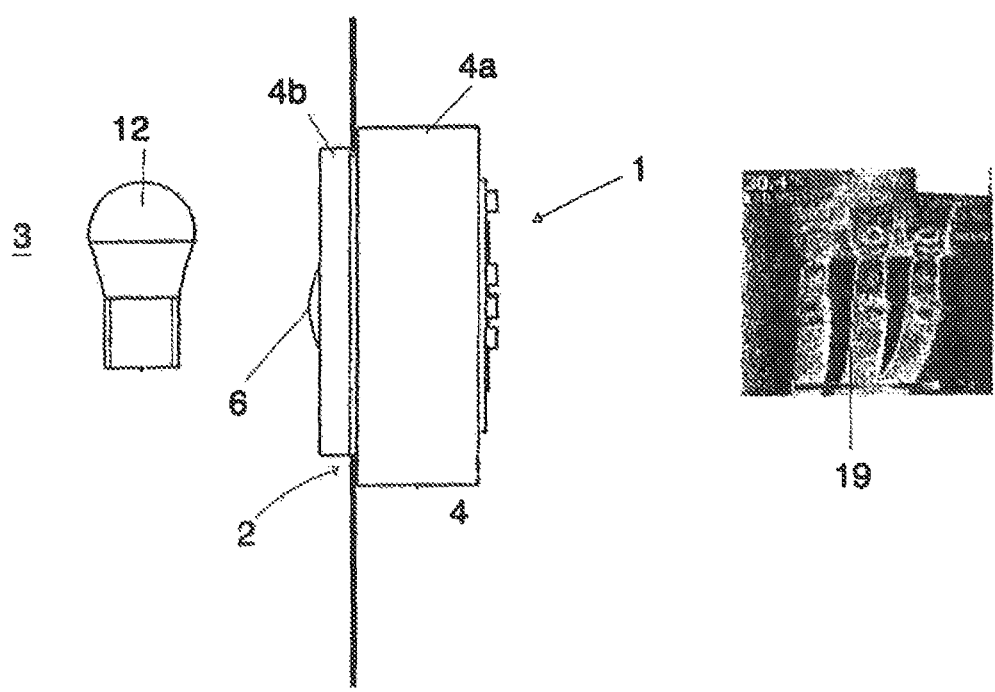
FIG. 2 is a schematic view of a temperature monitoring device according to the invention.

The wall 8 is provided with an opening 2, generally having a circular profile, to enable the installation of the monitoring device 1 according to the invention. Obviously, the location of the opening 2 is determined on the basis of the location of the objects to be observed inside the enclosure 3. In FIG. 2, the object for which the temperature is to be monitored is represented by a bulb 12.

The device 1 according to the invention comprises a frame 4 intended to be fitted into said opening 2 and to be attached in a tight manner thereon. For this purpose, the frame 4 is provided with attachment means on said opening and sealing means for ensuring the tightness of the wall 8, between the inside and outside of the enclosure 3, at said opening 2. As illustrated in the figures, the frame 4 is made of one piece.

In the embodiment shown, the frame 4 comprises a main body 4a and, at the front, a cylindrical threaded ring 4b intended to be inserted into said opening 2. The main body 4a comprises larger dimensions than that of the threaded ring 4b such that the main body 4a is pressed against the wall 8 of the enclosure 3 when the threaded ring 4b is inserted into said opening 2. Moreover, in order to attach the device onto the wall 8, a nut 12 is mounted on the threaded ring 4b via the inside of the enclosure 3, when the threaded ring is inserted into the opening 2.

It should be noted that the threaded ring 4b advantageously has a flat spot for ensuring the alignment of the device. Obviously, in this case, the opening 2 has a complementary shape with the shape of the threaded ring 4b.

Figure 7:
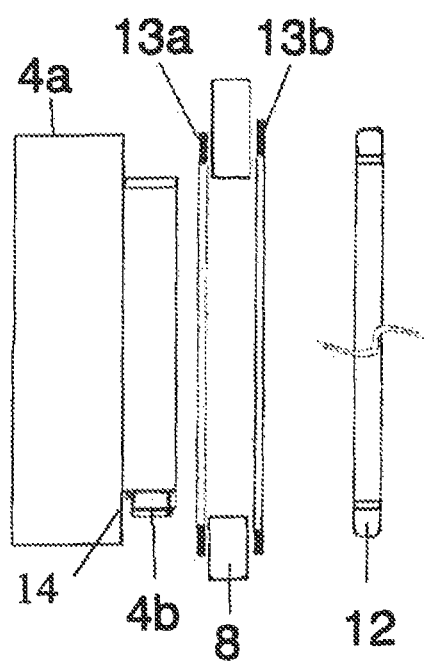
FIG. 7 is a sectional view illustrating in detail the attachment means and sealing means of the device according to one embodiment of the invention.

Moreover, to ensure the tightness of the assembly, the device comprises two seals 13a, 13b, particularly shown in FIG. 7. The first seal 13a is an O-ring 13a inserted between the outer face of the wall 8 of the enclosure 3 and a bearing surface 14 of the main body 4a. Moreover, the second seal 13h is a self-adhesive flat seal attached on the inner face of the wall 8 and inserted between said wall and the nut 12. Advantageously, the seals 13a, 13b used are made of acrylonitrile butadiene or any other equivalent synthetic material.

By means of this tight assembly on the wall 8 of the enclosure 3, the device prevents the entry of dust, water or other foreign bodies inside the enclosure 3. However, it is possible to envisage other types of attachment and/or sealing means without leaving the scope of the invention.

Figure 3:
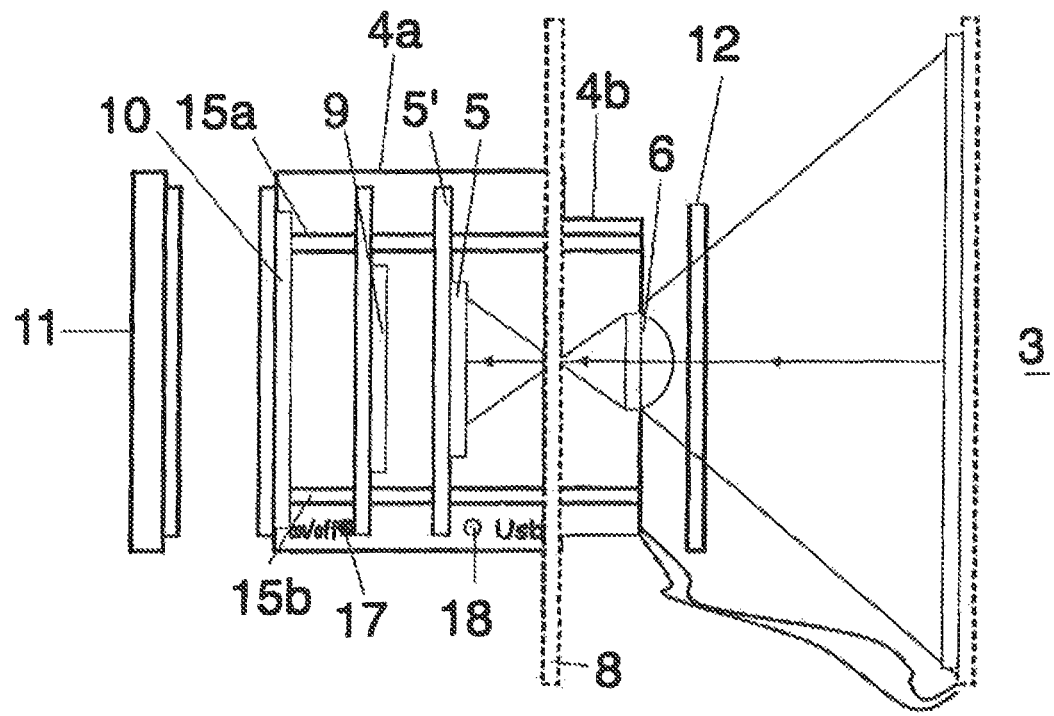
FIG. 3 is an exploded sectional view of a temperature monitoring device according to one embodiment of the invention.
Figure 4:
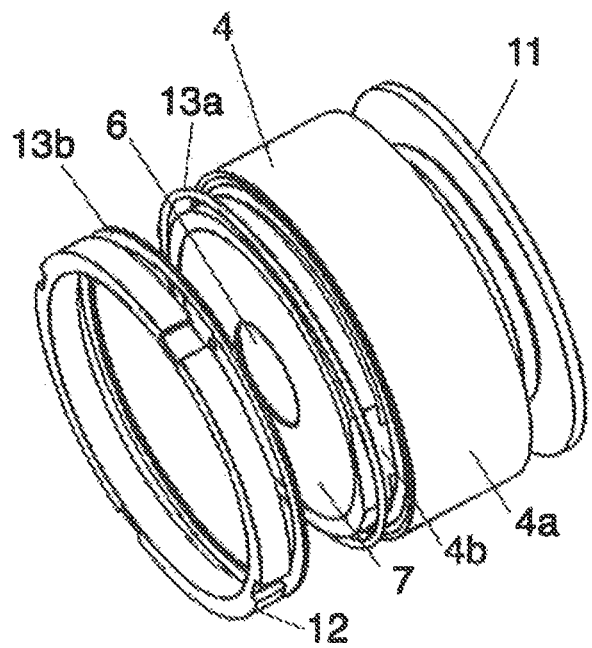
FIG. 4 is an exploded front perspective view of a temperature monitoring device according to the invention.

Moreover, the temperature monitoring device 1 comprises an optical system 6 and a heat sensor 5, shown in FIG. 3. The optical system 6 is used to focus the infrared waves from the enclosure 3 towards the heat sensor 5 receiving said infrared waves and converts these waves into electrical signals. In this way, a single frame 4 is suitable for housing the heat sensor 5, the optical system 6 and ensure the tight attachment of the device 1 on the wall 8. The frame illustrated is embodied in the form of a housing, which is cylindrical in this case, housing all the elements for outputting the electrical signals from the heat sensor.

The optical system 6 is housed in the frame 4 and is intended to be positioned inside the enclosure 3. This arrangement of the optical system 6 inside the enclosure 3 makes it possible to obtain a greater infrared wave capture angle. Preferably, the optical system 6 is a wide-angle lens. The capture angle of such an optical system is typically in the region of 120 to 160°. The optical system 6 is transparent to infrared waves and typically transparent to waves with a wavelength between 0.3 and 13 μm.

In the embodiment shown, the device comprises a support disk 7 having a central orifice wherein the optical system 6 is positioned. The optical system 6 is attached in a tight manner to said support disk 7 by silicone bonding or by a clamp with a seal, not shown. The optical system 6 protrudes from the support disk towards the inside of the enclosure 3. The support disk 7 is attached in a tight manner on the frame 4. Similarly, the support disk 7 can be attached on the frame 4 by silicone bonding or by a tight clamp. The support disk 7 forms, with the optical system 6, the front wall of the device 1.

In one particular embodiment, the optical system 6 may particularly be made of zinc selenide or barium fluoride for example. According to the invention, the optical system 6 is arranged inside the enclosure 3 and is thus partly protected against external attacks such as dust and water. In this way, the invention makes it possible to use a wide range of materials for the manufacture of the optical system 6, and particularly more sensitive materials than the materials commonly used for mobile cameras, for example.

The heat sensor 5 is housed inside the frame 4 and rigidly connected thereto. The heat sensor 5 is, for example, a non-cooled quantum well infrared photodetector (QWIP detector), or a new-generation non cooled microbolometer detector. The heat sensor 5 is mounted on a suitably centred support card 5'. The support card 5 has, for example, orifices engaging with guide rods 15a, 15b rigidly connected to the frame 4 for centring the heat sensor 5. The use of a non-cooled heat sensor requires a considerable cooling source such as liquid nitrogen and a specific housing for the heat sensor and the cooling device thereof.

The device 1 also comprises an infrared processing card 9, also housed in the same frame 4, and suitable for acquiring and processing the signals from the heat detector 5 so as to obtain an infrared image 16 of the inside of the enclosure 3. This processing card 9 is provided with acquisition and analogue-digital conversion means and a video signal output and transmission interface. This processing card 9 may also comprise compression means and a USB output interface.

Advantageously, the processing card 9 comprises means for analysing the signals suitable for assigning a temperature to each of the points of the infrared image. Advantageously, the device further comprises an integrated alarm system, connected to said processing card 9 and suitable for generating an alarm signal for notifying users of component overheating.

Moreover, the device 1 further comprises a memory for storing information relating to the installation to be monitored and/or an infrared image log.

Figure 5:
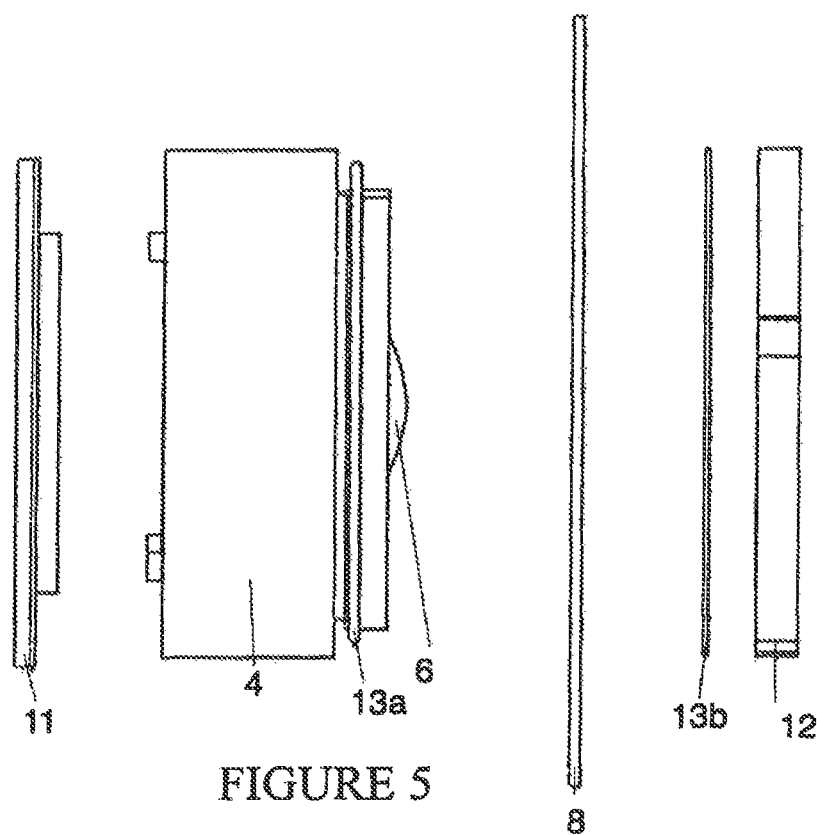
FIG. 5 is an exploded side view of a temperature monitoring device according to the invention.
Figure 6:
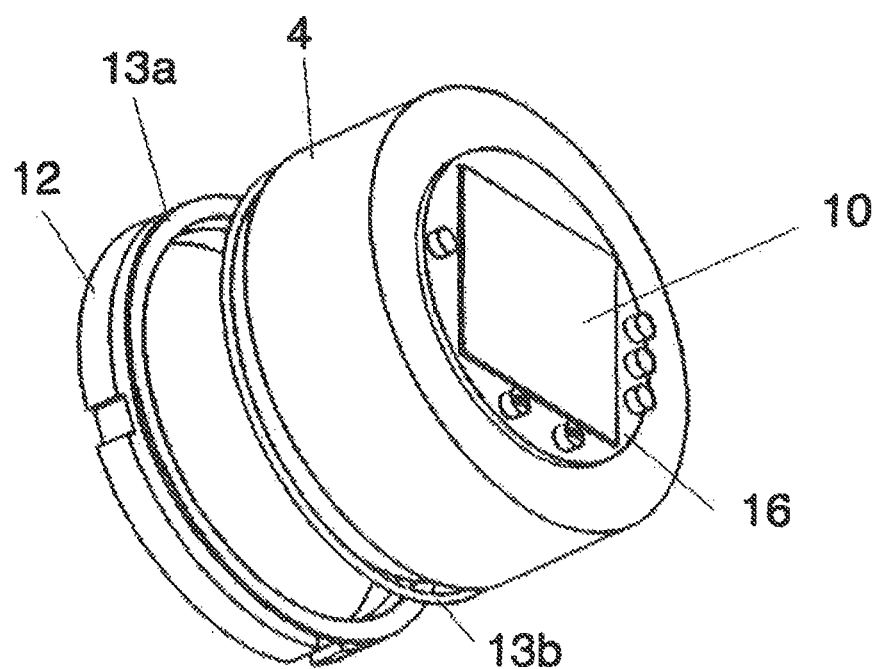
FIG. 6 is an exploded rear perspective view of a temperature monitoring device according to the invention.

The temperature monitoring device 1 is provided with means 10 for displaying an infrared image, shown more specifically in FIGS. 5 and 6, connected to an output interface of the processing card 9. These means are suitable for direct viewing of the infrared image 19 of the equipment to be observed. The display means 10 are also housed in the frame 4 and extend to the rear face of the device. In the embodiment shown, the device 1 comprises a disk 16 having an orifice for housing the display means and forming, with the display means 10, the rear face of the monitoring device. For example, the display means 10 consist of an LCD screen. According to one embodiment of the invention, the device 1 also comprises, at the rear face, control keys suitable, for example, for moving a pointer on the screen so as to obtain the temperature of the pointed area or navigate in menus of software for operating the device 1.

Advantageously, in order to protect the display means, the device 1 comprises a removable cover 11, shown in FIG. 3, arranged to be positioned on the frame and cover the rear face of the device 1. This protective cover 11 has the same profile as the main body 4b of the frame and is attached thereon by screwing or by magnetisation, for example.

Moreover, the device 1 comprises, in the embodiment illustrated, a connector 17 intended to receive an electrical power supply connector. The connector 17 is mounted in an orifice formed in the frame 4. In this way, the device 1 according to the invention does not comprise an internal power supply and can be powered either by a mobile power supply or by a power supply housed in the enclosure 3 to be monitored.

Moreover, in one particular embodiment of the invention, the device is provided with a USE port 18 housed in the frame 4 and connected to the processing card 9. This USB port 13 is suitable for connected the monitoring device to a computer or to computer devices such as data storage devices or printing devices, so as to enable data exchange and particularly infrared image exchange.

The invention is described above as an example. It is obvious that those skilled in the art would be capable of producing various alternative embodiments of the invention without leaving the scope of the invention.

The invention claimed is:

1. A temperature monitoring device of at least one object, configured to be attached inside an opening of a wall defining an area in an enclosure to be monitored that comprises the object, the temperature monitoring device comprising:
   a single frame configured to be fitted into said opening, provided with means for attachment onto said opening and with sealing means for attaching the single frame on the wall and ensuring that the wall is sealed at the opening for preventing the entry of dust, water or other foreign bodies inside the enclosure;
   a heat sensor that is housed in said single frame and is arranged so as to receive infrared waves and convert said waves into electrical signals to obtain an infrared image of the inside of the enclosure;
   an optical system housed in said single frame and rigidly connected therewith for focusing the infrared waves from the area to be monitored, towards said heat sensor,
   wherein the single frame comprises:
      a main body being outside the enclosure when the device is attached inside the opening of the wall and housing the heat sensor, and
      a cylindrical threaded ring intended to be inserted into said opening, being inside the enclosure when the device is attached inside the opening of the wall, and housing the optical system, the optical system protruding to the front with respect to the threaded ring, inside the enclosure,
   wherein the single frame that comprises the main body and the cylindrical threaded ring is made of one piece,
   wherein the main body comprises dimensions greater than that of the threaded ring such that the main body is pressed against the wall of the enclosure when the cylindrical threaded ring is inserted into said opening, and
   wherein the temperature monitoring device further comprises a nut mounted on the cylindrical threaded ring to sandwich the wall between the main body of the single frame and the nut.

2. The temperature monitoring device according to claim 1, wherein said optical system forms a front wall of the device, intended to be positioned between the wall and the area to be monitored.

3. The temperature monitoring device according to claim 1, further comprising a support disk attached in a tight manner to the frame inside the cylindrical threaded ring and having a central orifice for positioning the optical system.

4. The temperature monitoring device according to claim 3, wherein the optical system protrudes to the front with respect to the support disk in a tight manner around the central orifice.

5. The temperature monitoring device according to claim 1, wherein the optical system comprises a wide-angle lens that protrudes the cylindrical threaded ring.

6. The temperature monitoring device according to claim 1, further comprising a processing card configured to process the signals from the heat sensor housed in the frame.

7. The temperature monitoring device according to claim 6, further comprising an integrated alarm system connected to said processing card and suitable for generating an alarm signal for notifying overheating in the area to be monitored.

8. The temperature monitoring device according to claim 1, further comprising a display means configured to display an infrared image housed in the frame and extending to the rear face of the device.

9. The temperature monitoring device according to claim 8, further comprising a removable protective cover of the display means arranged to cover the rear face of the device.

10. The temperature monitoring device according to claim 1, further comprising a connector intended configured to receive an electrical power supply connector.

11. The temperature monitoring device according to claim 1, further comprising a USB port.

12. The temperature monitoring device according to claim 1, wherein the heat sensor comprises a non-cooled sensor.

13. The temperature monitoring device according to claim 12, further comprising an O-ring mounted on the cylindrical threaded ring between the wall and the main body of the frame so as to ensure the tightness of the wall at the opening.

14. The temperature monitoring device according to claim 1, further comprising a self-adhesive flat seal mounted on said wall and inserted between the wall and the nut.

15. The temperature monitoring device according to claim 1, wherein the enclosure comprises the wall having the opening, and at least one the temperature monitoring device is fixedly mounted in said opening.

16. A method of using a temperature monitoring device for monitoring at least one piece of electrical equipment, the temperature monitoring device configured to be attached inside an opening of a wall of a cabinet defining an enclosure that comprises the piece of electrical equipment, the method comprising:
fitting a single frame of the temperature monitoring device into the opening, provided with means for attachment onto the opening and with sealing means for attaching the single frame on the wall and ensuring that the wall is sealed at the opening for preventing the entry of dust, water or other foreign bodies inside the enclosure;
housing and arranging a heat sensor of the temperature monitoring device in the single frame to receive infrared waves from at least the piece of electrical equipment and convert the waves into electrical signals to obtain an infrared image of the inside of the enclosure;
providing and connecting an optical system of the temperature monitoring device with the single frame for focusing the infrared waves from the area to be monitored, towards the heat sensor,
wherein the single frame comprises:
a main body being outside the enclosure when the device is attached inside the opening of the wall and housing the heat sensor, and
a cylindrical threaded ring intended to be inserted into the opening, being inside the enclosure when the device is attached inside the opening of the wall, and housing the optical system, the optical system protruding to the front with respect to the threaded ring, inside the enclosure,
wherein the single frame that comprises the main body and the cylindrical threaded ring is made of one piece, and the main body comprises dimensions greater than that of the threaded ring such that the main body is pressed against the wall of the cabinet when the threaded ring is inserted into the opening; and
mounting a nut on the threaded ring to sandwich the wall between the main body of the single frame and the nut.

17. The method according to claim 16, wherein the temperature monitoring device is arranged such that the optical system protrudes towards the area to be monitored.

18. A temperature monitoring device of at least one piece of electrical equipment, configured to be attached inside an opening of a wall of a cabinet defining an enclosure to be monitored that comprises the piece of electrical equipment, the temperature monitoring device comprising:
a single frame configured to be fitted into the opening, provided with means for attachment onto the opening and with sealing means for attaching the single frame on the wall and ensuring that the wall is sealed at the opening for preventing the entry of dust, water or other foreign bodies inside the enclosure;
a heat sensor that is housed in the single frame and is arranged so as to receive infrared waves from at least the piece of electrical equipment and convert the waves into electrical signals to obtain an infrared image of the inside of the enclosure; and
an optical system housed in the single frame and rigidly connected therewith for focusing the infrared waves from the area to be monitored, towards the heat sensor,
wherein the single frame comprising comprises:
a main body being outside the enclosure when the device is attached inside the opening of the wall and housing the heat sensor, and
a cylindrical threaded ring intended to be inserted into the opening, being inside the enclosure when the device is attached inside the opening of the wall, and housing the optical system, the optical system protruding to the front with respect to the threaded ring, inside the enclosure,
wherein the single frame which comprises the main body and the cylindrical threaded ring being made of one piece,
wherein the main body comprising dimensions greater than that of the threaded ring such that the main body is pressed against the wall of the cabinet when the threaded ring is inserted into the opening, and
wherein the temperature monitoring device further comprises a nut intended to be mounted on the threaded ring, so as to sandwich the wall between the main body of the single frame and the nut.

\* \* \* \* \*